(12) United States Patent
Webber

(10) Patent No.: US 8,127,785 B2
(45) Date of Patent: Mar. 6, 2012

(54) PIPELINE BREAKAWAY COUPLING

(75) Inventor: Anthony John Webber, Wiltshire (GB)

(73) Assignee: KLAW Products Ltd., Wiltshire (GB)

( * ) Notice: Subject to any disclaimer, the term of this patent is extended or adjusted under 35 U.S.C. 154(b) by 0 days.

(21) Appl. No.: 12/133,821

(22) Filed: Jun. 5, 2008

(65) Prior Publication Data

US 2009/0008935 A1   Jan. 8, 2009

(30) Foreign Application Priority Data

Jun. 5, 2007   (GB) .................................. 0710717.0

(51) Int. Cl.
*F16K 17/36* (2006.01)
(52) U.S. Cl. ................. 137/68.14; 137/614.04
(58) Field of Classification Search ............... 137/68.11, 137/68.14, 68.15, 68.16, 614.04
See application file for complete search history.

(56) References Cited

U.S. PATENT DOCUMENTS

| | | | |
|---|---|---|---|
| 2,533,640 A | 12/1950 | Ulrich | |
| 2,666,656 A | 1/1954 | Bruning | |
| 3,719,194 A | 3/1973 | Anderson et al. | |
| 3,921,656 A * | 11/1975 | Meisenheimer et al. | 137/68.15 |
| 4,090,524 A * | 5/1978 | Allread et al. | 137/68.15 |
| 4,232,697 A * | 11/1980 | Meisenheimer, Jr. | 137/68.15 |
| 4,295,484 A | 10/1981 | Meisenheimer, Jr. | |
| 4,301,823 A * | 11/1981 | Meisenheimer, Jr. | 137/68.15 |
| 4,328,822 A | 5/1982 | Wilhelm | |
| 4,625,746 A | 12/1986 | Calvin et al. | |
| 4,854,338 A * | 8/1989 | Grantham | 137/68.14 |
| 4,884,591 A * | 12/1989 | Webster | 137/68.14 |
| 5,351,708 A | 10/1994 | Donato et al. | |
| 5,738,143 A * | 4/1998 | Faughn | 137/614.03 |
| 2002/0007847 A1 | 1/2002 | Abrams | |

FOREIGN PATENT DOCUMENTS

| | | |
|---|---|---|
| DE | 44 30 132 C1 | 9/1995 |
| GB | 2391051 A | 1/2004 |
| WO | WO 91/12459 | 8/1991 |

* cited by examiner

*Primary Examiner* — John Rivell
*Assistant Examiner* — Macade Brown
(74) *Attorney, Agent, or Firm* — Dickstein Shapiro LLP

(57) ABSTRACT

A pipeline breakaway coupling (10) comprising a pair of valve housing members (12,14) fixedly attached to each other by means of one or more breakaway coupling members (16). The valve housing members (12,14) define a hollow bore (18) along which flowable material may flow and the breakaway coupling members (16) permit the valve housing members (12,14) to separate from each other when exposed to a tensile load exceeding a predetermined limit.
An end cap (26) releasably connected to each valve housing member (12,14) to allow connection of the valve housing members (12,14) to respective inlet and outlet pipelines.
A valve cassette (20) is releasably retained between each valve housing member (12,14) and the respective end cap (26). Each valve cassette (20) includes a valve member (22) movable between a valve open position and a valve closed position. The valve member (22) when at its valve closed position being sealingly engaged with a valve seat (24) formed in respective valve housing member (12,14), thereby closing the hollow bore in the respective valve housing member (12,14). Each valve member (22) is biased to move to its valve closed position on separation of the valve housing members (12,14).

19 Claims, 14 Drawing Sheets

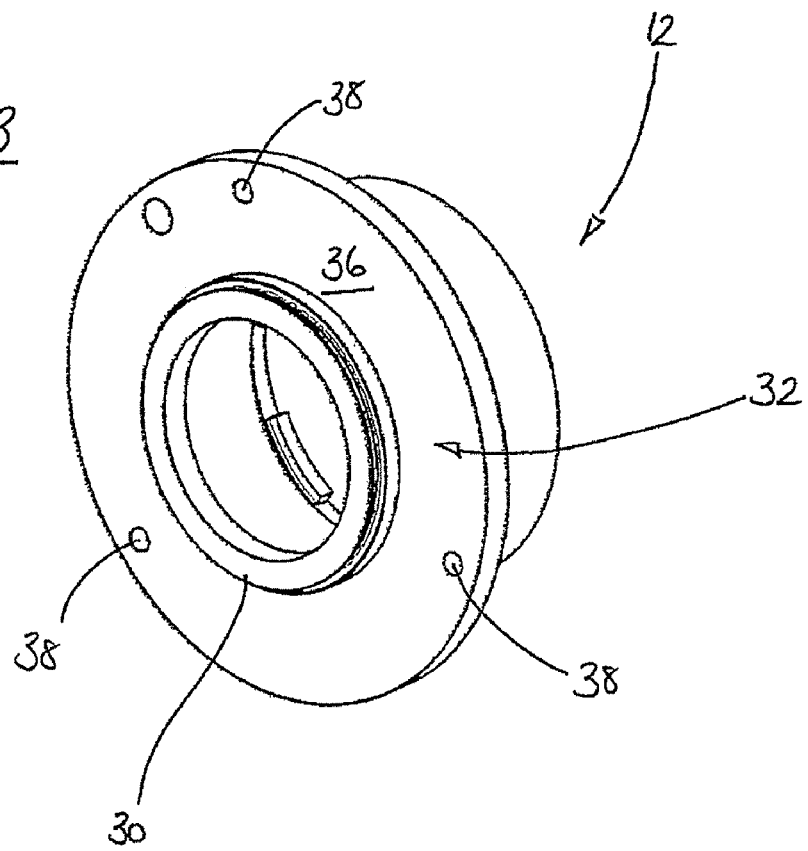
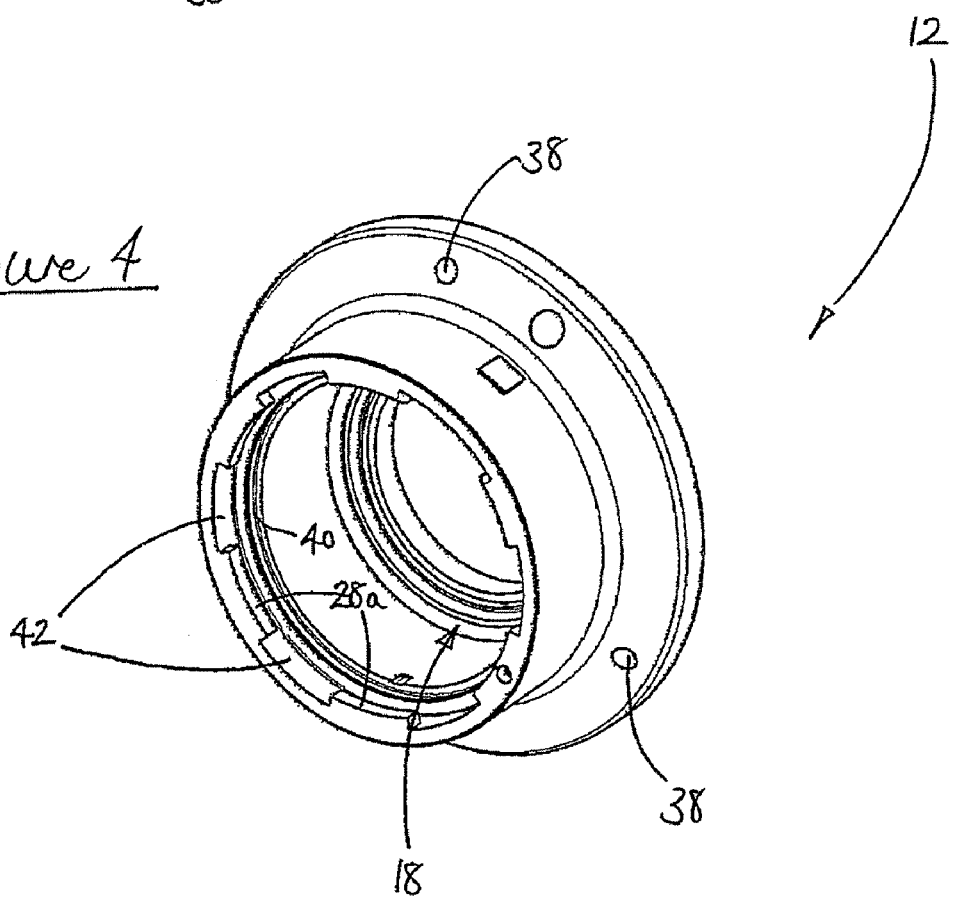

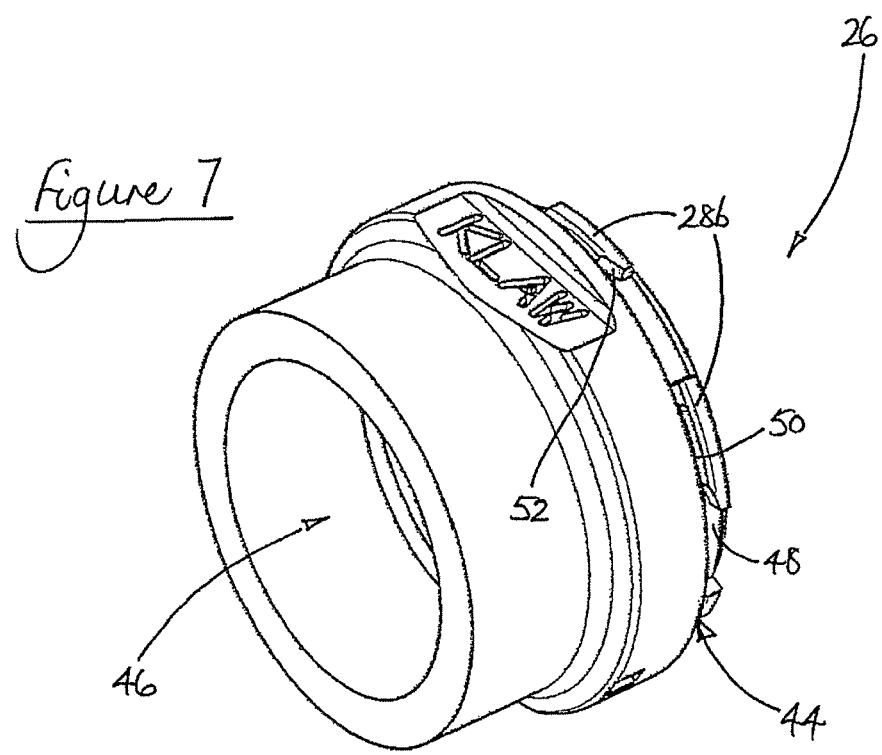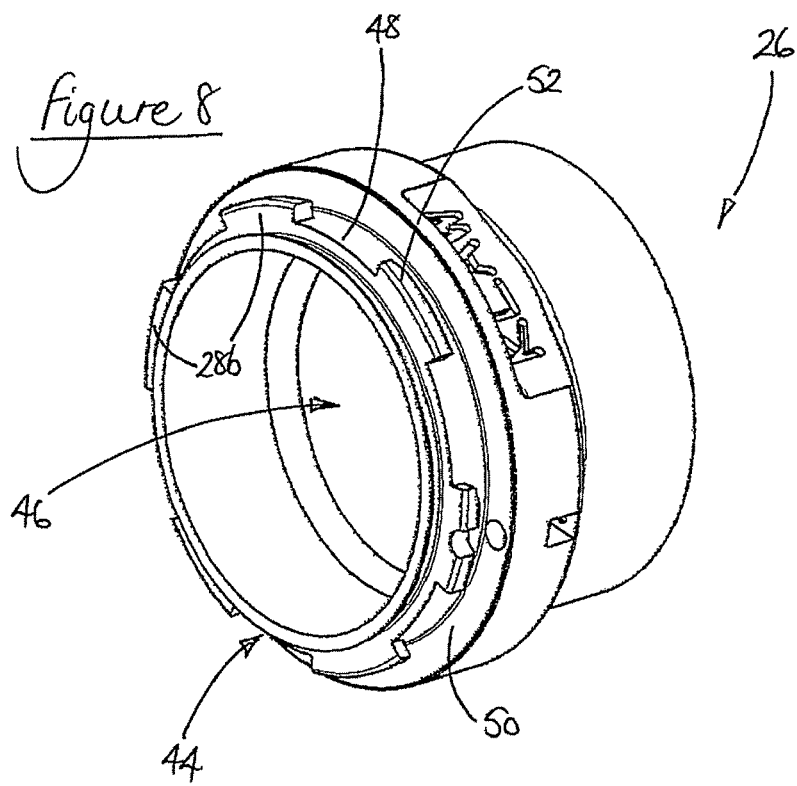

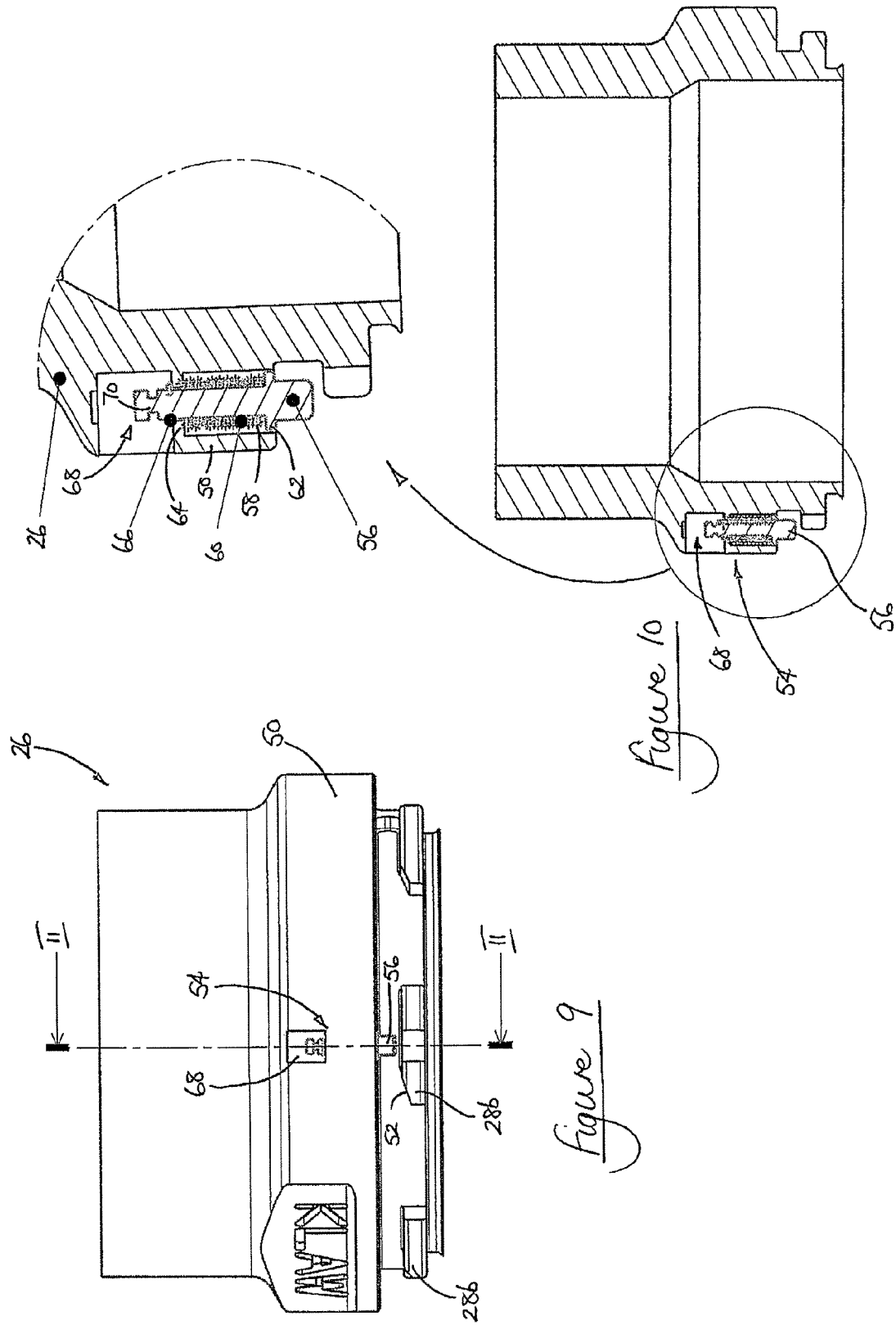

US 8,127,785 B2

PIPELINE BREAKAWAY COUPLING

The invention relates to a pipeline breakaway coupling.

Breakaway couplings are known and are used in situations where a pipeline may be exposed to a tensile loading which, in the absence of a breakaway coupling, could cause the pipeline to fracture. Typically such a pipeline may be one used for carrying material between a ship and a dock. If such a fracture occurs, the material being conveyed along the pipeline flows freely out of the fractured ends of the pipeline. This can cause significant spillage that is expensive to clear and is environmentally undesirable. The presence of a breakaway coupling enables the pipeline to fracture at a specified location (i.e. at the coupling) and for spillage to be avoided by providing valves in the breakaway coupling which are actuated when the coupling breaks.

Conventionally a breakaway coupling includes a pair of valve housing members attached to inlet and outlet sections of a pipeline, the valve housing members housing the valves and being fixedly attachable to each other by means of one or more breakaway coupling members that break when exposed to a tensile load exceeding a predetermined value.

The individual components of the valve housing members and the valves are often fixedly connected by means of welds or other permanent connections, thereby rendering maintenance, repair and replacement of the individual components difficult, and therefore time consuming and expensive.

Depending on the type of flowable material to be conveyed along the pipeline, the size of the pipeline and the environment in which the pipeline is to be used, the valve housing members may also be required to take different forms and or differ in size and shape. In addition different valve assemblies may be used to provide the required sealing on breakage of the coupling.

As a consequence, breakaway couplings are manufactured on an individual basis, each individual component of the coupling being chosen and constructed to form a breakaway coupling that meets a customer's specific requirements. This of course increases the lead time required to provide the breakaway coupling since the unpredictability of a customer's requirements means that it is not cost effective to manufacture breakaway couplings for stock purposes.

According to an aspect of the invention there is provided a pipeline breakaway coupling comprising:

a pair of valve housing members fixedly attached to each other by means of one or more breakaway coupling members, the valve housing members defining a hollow bore along which flowable material may flow and the breakaway coupling members permitting the valve housing members to separate from each other when exposed to a tensile load exceeding a predetermined limit;

an end cap releasably connected to each valve housing member to allow connection of the valve housing members to respective inlet and outlet pipelines via the end cap members; and a valve cassette releasably retained between each valve housing member and the respective end cap, each valve cassette including a valve member movable between a valve open position and a valve closed position, the valve member when at its valve closed position being sealingly engaged with a valve seat formed in the respective valve housing member, and each valve member being biased to move to its valve closed position on separation of the valve housing members.

The provision of valve housing members and end caps that are releasably connected to each other, and valve cassettes releasably retained between the valve housing members and the end caps, results in a modular construction that allows modules of the breakaway coupling to be removed for repair or replacement should they become worn or damaged during use of the breakaway coupling. For example, in the event the breakage of the or each breakaway coupling member results in damage to one or both of the valve housing members, the or each damaged valve housing member can easily be separated from the respective end cap and replaced, the respective valve cassette being releasable and then releasably retained between a replacement valve housing member and the respective end cap.

Separation of the modules in addition facilitates regular maintenance, particularly of the valve cassette to ensure that the breakaway coupling continues to operate effectively following exposure to flowable material flowing through the hollow bore during use.

The modular construction also allows modification of the breakaway coupling so as to incorporate different valve housing members, valve cassettes and/or end caps to thereby render the breakaway coupling suitable for use in a different pipeline environment.

At the outset, the modular construction of the breakaway coupling allows a range of breakaway couplings to be constructed from different combinations of valve housing members, valve cassettes and end caps.

For example, in one embodiment of the invention, the valve housing members may include flange portions defining opposed contact surfaces in abutting contact. In such an embodiment the one or more breakaway coupling members extend through the flange portions to maintain the abutment surfaces in abutting engagement, and thereby fixedly attach the valve housing members to each other.

In such an embodiment, the or each breakaway coupling member may include a stud formed to include a weakened portion that breaks on exposure to a tensile load exceeding the predetermined limit.

In another embodiment, the valve housing members may be formed to define mutually engageable screw threads to fixedly attach the valve housing members together. The screw threads are breakable to permit separation of the valve housing members when exposed to a tensile load exceeding the predetermined limit.

Consequently, if a stock of the various modules is created, the modular construction of the invention allows a breakaway coupling to be tailor-made to meet a customer's requirements by simply interconnecting the appropriate modules. The need for lengthy welding and construction steps that would otherwise be required to construct the breakaway coupling is thereby obviated and the lead time for providing the breakaway coupling is greatly reduced.

Each valve housing member may be releasably connected to the respective end cap by means of mutually engageable connectors.

In such embodiments, each valve housing member and or the respective end cap preferably includes a retention mechanism to prevent unintentional disengagement of the mutually engageable connectors of the valve housing member and the end cap.

The provision of the retention mechanism thereby ensures that the valve housing members do not separate from the respective end caps when exposed to external forces and vibrations during use.

In one embodiment employing mutually engageable connectors each valve housing member and the respective end cap may be formed to define a pair of opposed collars, one collar receivable within the other. The inner collar include a plurality of projections spaced about its outer circumference and the outer collar includes a plurality of projections spaced about its inner circumference, the relative sizes of the projections on the opposed collars being chosen such that each projection on the inner collar passes between adjacent projections on the outer collar and, on rotation of the valve housing member relative to the end cap, the projections align to prevent withdrawal of the inner collar from the outer collar and thereby interconnect the valve housing member and the respective end cap until the valve housing member is rotated relative to the end cap to cause misalignment of the projections.

This arrangement allows connection of the members in a bayonet-type manner permitting separation thereof on rotation of the valve housing member relative to the end cap.

In this particular embodiment each valve housing member or each end cap may include a retention mechanism in the form of a spring loaded plunger biased to extend between the projections provided on the respective end cap or valve housing member to which the valve housing member or end cap is connected and prevent rotation of each valve housing member relative to the respective end and thereby prevent unintentional disengagement of the connectors.

To allow intentional disengagement of the connectors, when required, the or each spring loaded plunger may be selective retractable against the bias to permit selective rotation of each valve housing member relative to the respective end cap to allow intentional disengagement of the mutually engageable connectors.

In other embodiments each valve housing member may be releasably connected to the respective end cap via the respective valve cassette.

In one such embodiment, each valve housing member and the respective end cap and valve cassette may be formed to define connector rings about their outer circumferences, the connector rings being releasably connected to each other by means of one or more removable coupling members.

Preferably the connector ring of each valve housing member abuts the connector ring of the respective valve cassette which in turn abuts the connector ring of the respective end cap.

The connector rings may be releasably connected to each other by screws threadedly received within apertures formed in the connector rings.

In such an embodiment each valve cassette preferably defines an abutment surface that abuts the respective valve housing member and each end cap defines an abutment surface that abuts the respective valve cassette, the abutment surfaces of the valve assemblies and the end caps are formed in an identical manner to allow connection of each end cap directly to the respective housing member on removal of the respective valve cassette.

This allows modification of the breakaway coupling to omit the valve cassette from one or both sides of the coupling whist retaining sealing engagement between the component parts.

The valve cassette is preferably slidably received at least in part within the hollow bore of the respective housing member. This allows the valve member to be positioned within the hollow bore of the respective housing member and thereby seek to reduce as much as possible the risk of any spillage on separation of the valve housing members.

In embodiments where each valve housing member is releasably connected directly to the respective end cap the valve cassette may be slidably received in its entirety within the hollow bore of the respective housing member.

The valve seat in each valve housing member may be formed on an inner surface of the valve housing member or as part of the valve cassette. However, in a preferred embodiment of the invention, the valve seat forms part of the respective valve cassette. This arrangement renders repair of replacement of the valve seat possible on removal of the valve cassette from the valve housing member rather than having to repair of replace a valve seat formed within the valve housing member which, by virtue of its location, is a more intricate and time consuming exercise.

The valve cassette slidably received in each valve housing member preferably includes an annular sub-housing and a valve mount extending radially from an inner surface of the sub-housing, the valve member being pivotally mounted on the valve mount, and the valve cassette further including a spring engaged between the valve member and the sub-housing to bias the valve member to the valve closed position in which it sealingly engages against a valve seat defined about an outer circumference of the sub-housing.

The provision of the annular sub-housing allows the individual valve components to be interconnected externally of a valve housing member and maintains the relative positions of the components within the hollow bore on insertion of the sub-housing into the valve housing member. Such relative positioning is important to ensure that the valve member seals the valve housing member on separation of the valve housing members.

The valve cassettes are preferably located in the valve housing members in an opposed configuration such that the valve members interengage and the spring bias applied to each valve member acts on the valve member to oppose movement of the other valve member to its closed position.

This arrangement avoids the need for additional components to prevent movement of each of the valve members to its valve closed position, thereby simplifying the construction of the breakaway coupling and simplifying maintenance and operation of the breakaway coupling.

Each valve cassette preferably includes a releasable latch member that acts to retain the respective valve member in the valve open position on movement of the valve member from the valve closed position to the valve open position following separation of the valve housing members.

The provision of the releasable latch members is advantageous in that it allows each of the valve members to be retained in its valve open position during re-connection of the valve housing members following breakage of the or each breakaway coupling member.

The releasable latch member of each valve cassette is preferably released when the valve members are brought into an opposed abutting arrangement on attachment of the valve housing members to each other. This ensures that each of the valve members is primed to move to its valve closed position on separation of the valve housing members.

An embodiment of the invention will now be described by way of a non-limiting example, with reference to the accompanying drawings in which:

FIGS. 3 and 4 show opposite ends of a first valve housing member of the pipeline breakaway coupling of FIG. 1:

FIGS. 7 and 8 show opposite ends of an end cap of the pipeline breakaway coupling of FIG. 1;

FIG. 9 shows a side view of the end cap of FIGS. 7 and 8;

FIG. 10 shows a cross-sectional view of the end cap of FIG. 9 along the line II-II;

Figure 1:
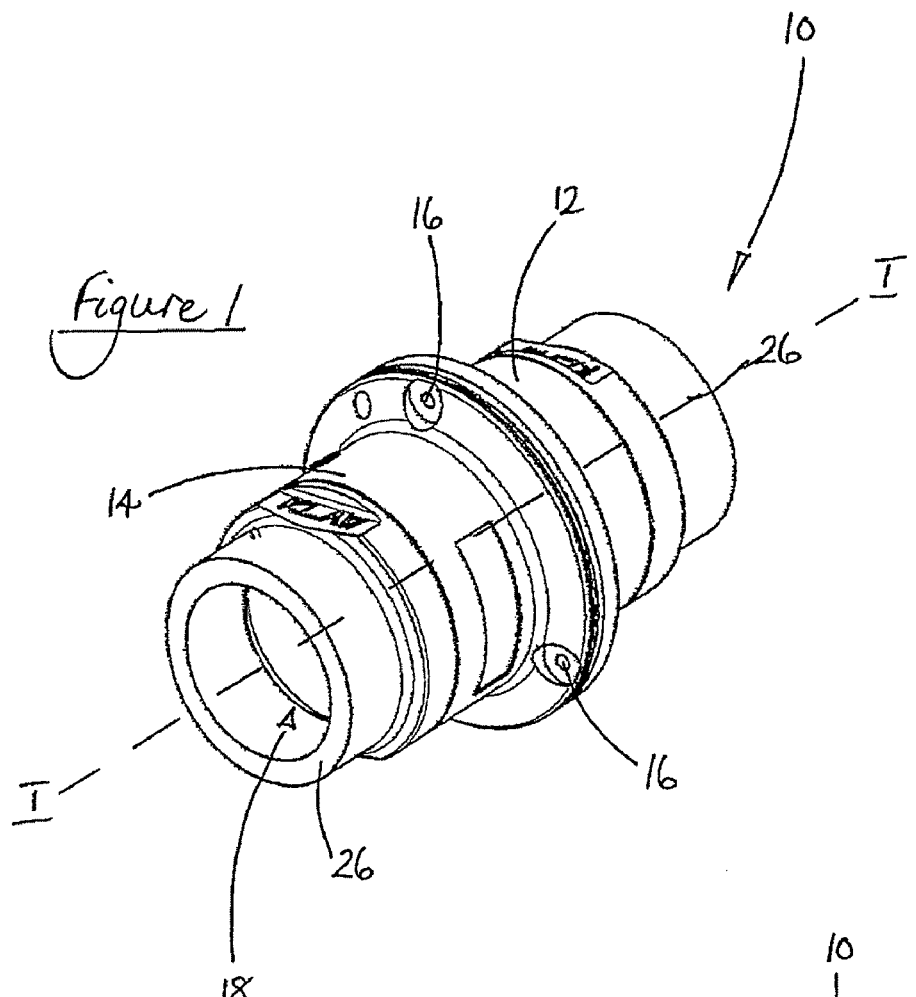
FIG. 1 shows a pipeline breakaway coupling according to a first embodiment of the invention.
Figure 2:
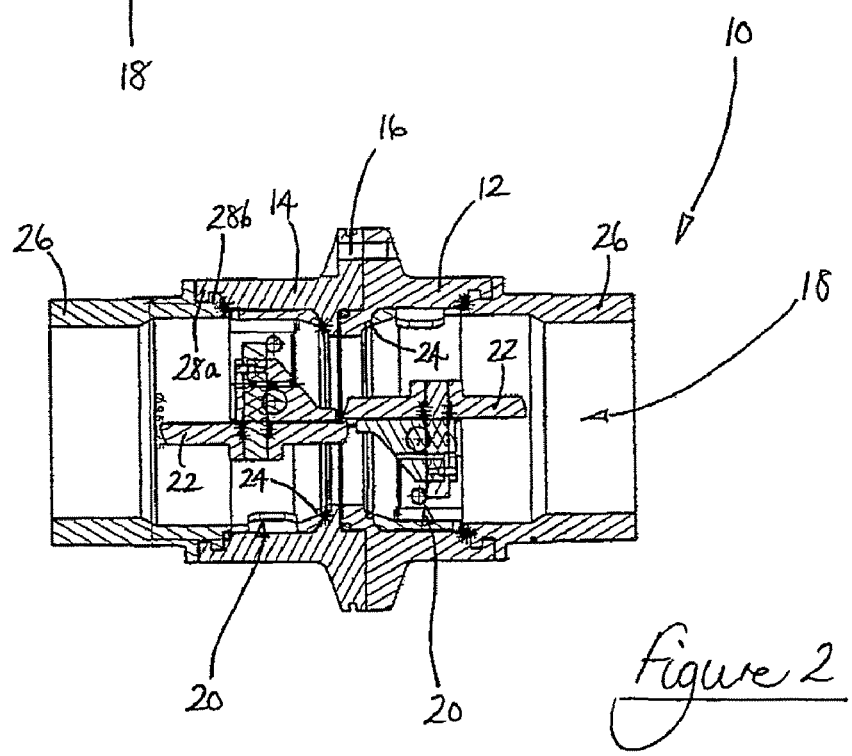
FIG. 2 shows a cross-sectional view of the pipeline breakaway coupling of FIG. 1 along the line I-I.

A pipeline breakaway connector 10 according to a first embodiment of the invention is shown in FIGS. 1 and 2.

The pipeline breakaway connector 10 includes first and second valve housing members 12,14 fixedly attached to each other by means of a plurality of breakaway coupling members 16.

The valve housing members 12,14 define a hollow bore 18 along which flowable material may flow, and the breakaway coupling members 16 are breakable to permit separation of the valve housing members 12,14 when the pipeline breakaway coupling 10 is exposed to a tensile load exceeding a predetermined limit.

An end cap 26 is releasably connected to each of the valve housing members 12,14 to allow connection of the valve housing members 12,14 to inlet and outlet pipelines (not shown).

A valve cassette 20 is releasably retained between each valve housing member 12,14 and the respective end cap 26 and includes a valve member 22 movable between a valve open position (FIG. 2) and a valve closed position. In its valve closed position, the valve member 22 sealingly engages a valve seat 24 formed in the respective valve housing member 12,14, thereby closing the hollow bore of the respective valve housing member 12,14.

Each valve member 22 is biased to move to its closed position on separation of the valve housing members 12,14 to close the hollow bore of the respective valve housing member 12,14.

Figure 5:
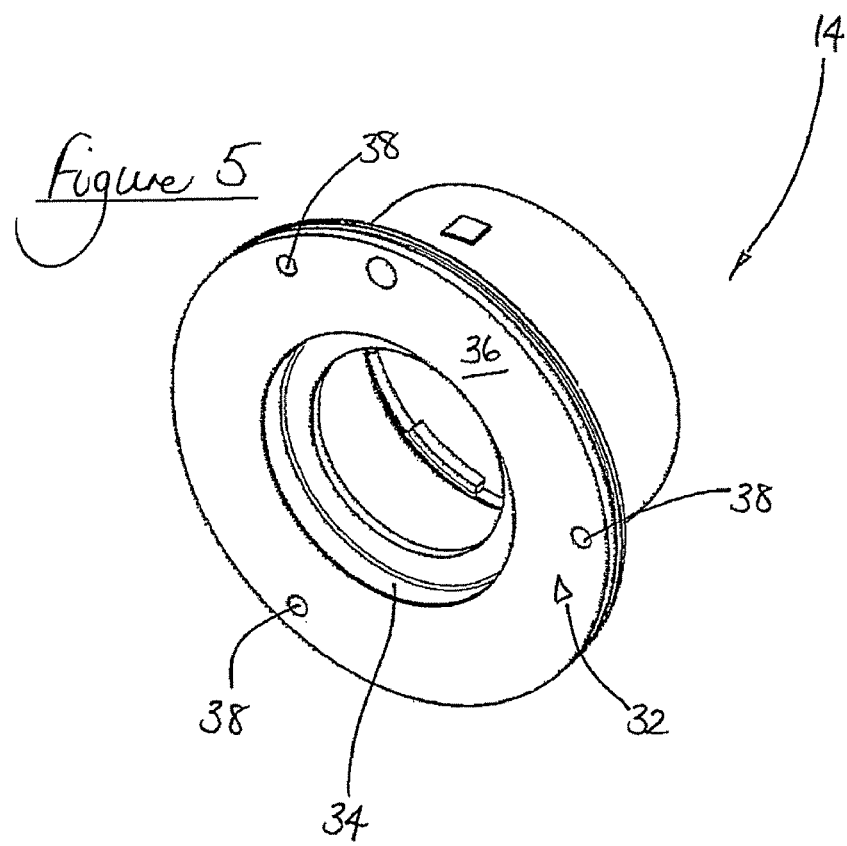
FIGS. 5 and 6 show opposite ends of a second valve housing member of the pipeline breakaway coupling of FIG. 1.

The valve housing members 12,14 in the embodiment shown in FIGS. 1 and 2 are formed to define male and female members as shown in FIGS. 3 and 5.

Referring to FIG. 3, the first valve housing member 12 is formed to define a male member including an annular engagement portion 30 protruding from an abutment end 32, which is intended to be brought into abutment with a corresponding abutment end 32 of the second valve housing member 14.

Referring to FIG. 5, the second valve housing member 14 includes a recessed opening 34 in its abutment end 32 shaped and sized to receive the annular engagement portion 30 of the first valve housing member 12 when the abutment ends 32 of the valve housing members 12,14 are brought into abutting engagement.

The abutment end 32 of each of the valve housing members 12,14 is formed to define a flange extending about its circumference, the flanges defining opposed contact surfaces 36 which on abutment of the valve housing members 12,14 are brought into abutting engagement. The breakaway coupling members 16 extend through apertures 38 formed in the flanges to maintain the abutment surfaces 36 in abutting engagement and thereby fixedly attach the valve housing members 12,14 to each other.

Figure 26:
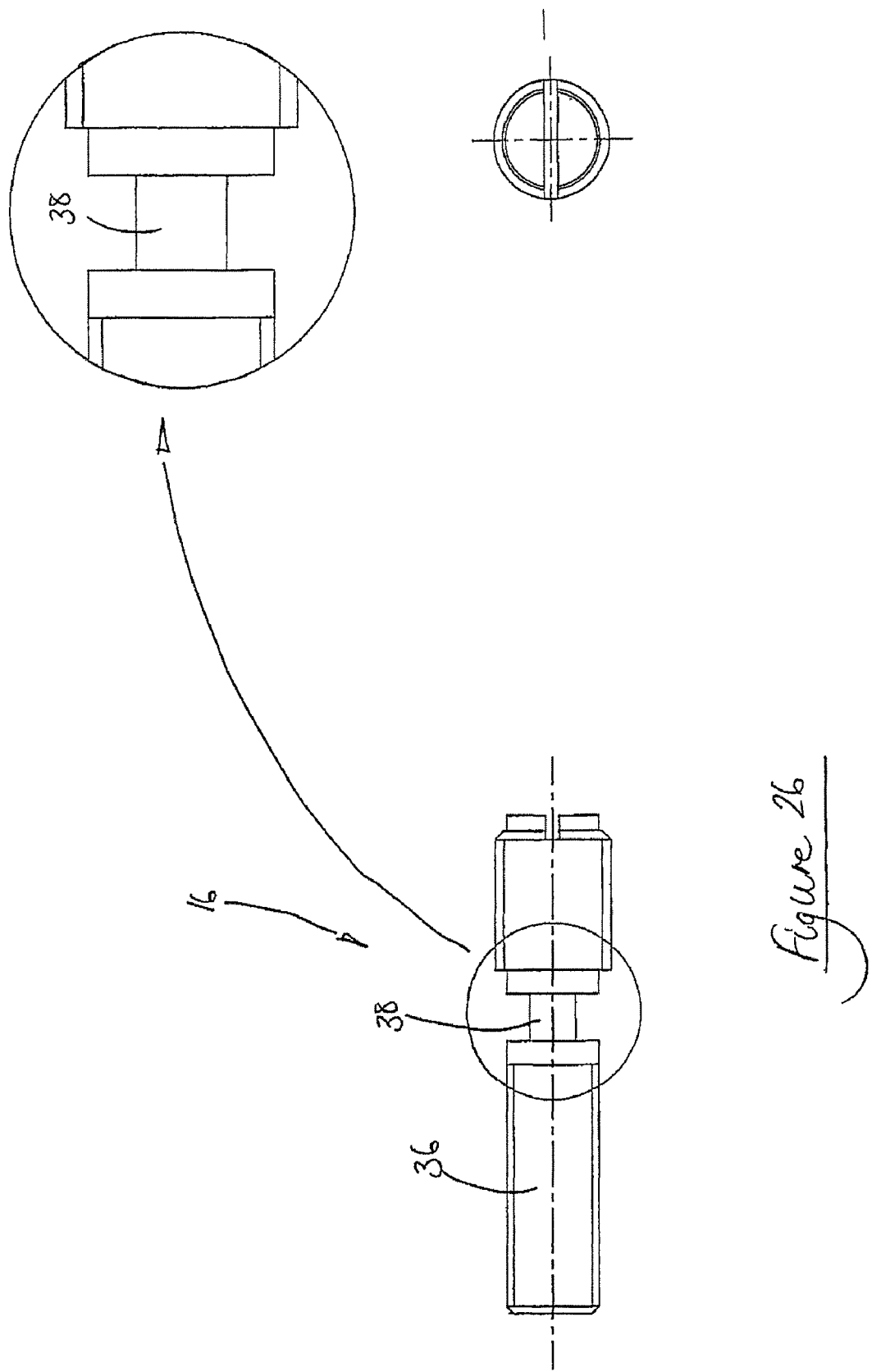
FIG. 26 shows a breakaway coupling member of the pipeline breakaway couplings of FIGS. 1 and 11.

In the embodiment shown in FIGS. 1 and 2, each of the breakaway coupling members 16 includes a stud 36 (FIG. 26) formed to include a weakened portion 38 that breaks on exposure to a tensile load exceeding the predetermined limit.

In other embodiments not shown in the figures, the abutment ends 32 of the valve housing members 12,14 may be formed such that the annular engagement portion 30 of the first valve housing member 12 and the recessed opening 34 of the second valve housing member 14 are formed to define mutually engageable screw threads to fixedly attach the valve housing 12,14 members together. In such embodiments, the screw threads are breakable to permit separation of the valve housing members 12,14 when the breakaway coupling 10 is exposed to a tensile load exceeding the predetermined limit.

Each end cap 26 is releasably connected to each of the valve housing members 12,14 by means of mutually engageable connectors 28a,28b.

Figure 6:
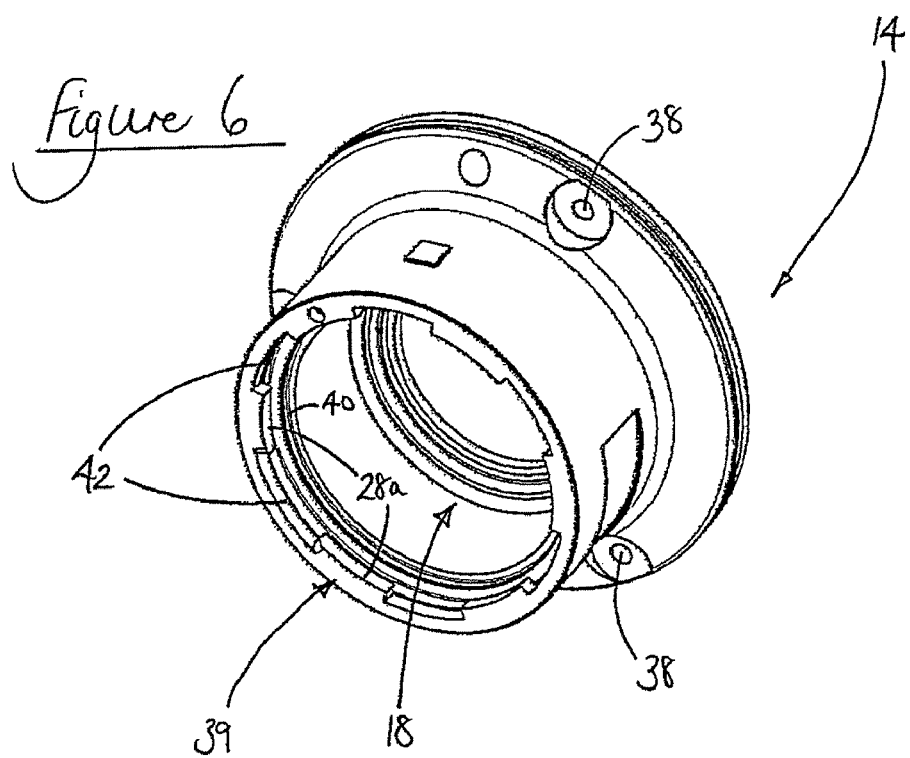

Connectors 28a are provided at an end cap connection end 39 of each of the valve housing members 12,14 to releasably connect the valve housing members 12,14 to the end caps 26, as shown in FIGS. 4 and 6.

Referring to FIGS. 4 and 6, it can be seen that the connectors 28a are formed as projections equidistantly spaced about the circumference of an opening to the hollow bore 18 in the end cap connection ends 39. The projections are formed so as to extend radially from an inner surface 40 of the hollow bore 18 and define openings 42 therebetween.

The openings 42 provided between the connectors 28a of each of the valve housing members 12,14 are sized and shaped to receive connectors 28b formed at a valve connection end 44 of a respective end cap 26.

Each end cap 26 is an annular member (FIGS. 7 and 8) defining a hollow bore 46.

At the valve connection end 44, the end cap 26 includes connectors 28b in the form of projections equidistantly spaced about the circumference of the end cap 26 and projecting radially from an outer surface 48 thereof.

The outer circumference of the valve connection end 44 of each end cap 26 is chosen such that the valve connection end 44 is receivable within the opening to the hollow bore 18 at the end cap connection end 39 of the respective valve housing member 12,14 when the connectors 28b of the end cap 26 are aligned with the openings 42 formed between the connectors 28a of the respective valve housing member 12,14.

Once the connectors 28b and corresponding openings 42 are aligned, axial movement of each end cap 26 relative to the respective valve housing member 12,14 causes the connectors 28b to pass through the corresponding openings 42. The end cap 26 and valve housing member 12,14 are then rotatable relative to each other such that the connectors 28b of the end cap 26 become aligned with the connectors 28a of the respective valve housing member 12,14. This alignment thereby prevents axial withdrawal of the end cap 26 from the valve housing member 12,14.

A shoulder 50 is preferably provided to extend about the outer surface of each end cap 26 so as to abut the end cap connection end 39 of the respective valve housing member 12,14, and thereby limit the extent to which the end cap 26 may be moved axially relative to the respective valve housing member 12,14. Preferably the shoulder 50 limits the extent to which the end cap 26 may be moved axially relative to the respective valve housing member 12,14 such that on rotation of the end cap 26 in its fully inserted position the connectors 28b of the end cap 26 frictionally engage the connectors 28a of the respective valve housing member 12,14 during relative movement thereof.

Each of the connectors 28b of the end cap 26 is formed to define a sloped engagement surface 52 (FIG. 9) that rides over the corresponding connector 28a of the respective valve housing member 12,14 as the connectors 28a,28b move relative to each other. This engagement tends to force the end cap 26 further axially into the hollow bore section 18a of the valve housing member 12,14 and increases the frictional engagement between the connectors 28a,28b such that the frictional engagement must be overcome in order to disengage the bayonet-type connection defined by the interengaged connectors 28a,28b.

In order to further resist disengagement of the bayonet-type connectors 28a,28b, each end cap 26 includes a retaining mechanism 54 in the form of a spring loaded plunger 56 biased to extend through an aperture 58 in the shoulder 50 of the end cap 26.

As can be seen from FIGS. 9 and 10, the spring loaded plunger 56 extends into the space located between the connectors 28b and the shoulder 50 of the end cap 26 prior to interengagement of the connectors 28b with the connectors 28a of the respective valve housing member 12,14.

The retaining mechanism 54 includes a plunger 56 and a compression spring 60 wound around the plunger 56 and trapped between a shoulder 62 formed at one end of the plunger 56 and a shoulder 64 provided on an inner surface of the aperture 58 towards the opposite end of the plunger 56 so as to bias the plunger 56 in a direction out of the aperture 58 towards the connectors 28b.

A circlip 66 provided about the plunger 56 on the opposite side of the shoulder 64 to the compression spring 60 prevents the plunger 56 falling through the aperture 58.

On rotational movement of the end cap 26 relative to the respective valve housing member 12,14, during interengagement of the connectors 28a,28b, one of the connectors 28a of the respective valve housing member 12,14 contacts a protruding end of the plunger 56.

The opposite end of the plunger 56 is accessible via an access opening 68 in the shoulder 50 and is formed to define a head portion 70. A tool inserted into the access opening 68 and engaged under the head 70 can be used to cause axial movement of the plunger 56 against the bias provided by the compression spring 60 and thereby cause retraction of the protruding end of the plunger 56 into the aperture 58.

This then allows continued rotation of the end cap 26 relative to the respective valve housing member 12,14 so as to allow the connectors 28a,28b to become aligned with each other.

Once the connectors 28a,28b are aligned, the plunger 56 is allowed to move under the influence of the compression spring 60 such that its protruding end extends from the aperture 58 and into an opening 42 provided between adjacent connectors 28a on the respective valve housing member 12,14.

In this position the plunger 56 prevents rotation of the end cap 26 relative to the respective valve housing member 12,14 in either direction a sufficient direction to allow disengagement of the connectors 28a,28b since such movement causes the connectors 28a of the valve housing member 12,14 to abut the protruding end of the plunger 56. It therefore prevents disengagement of the bayonet-type connection caused by interengagement of the connectors 28a,28b until the protruding end of the plunger 56 is retracted into the aperture 58 by means of a tool engaged under the head 70 of the plunger 56. This in turn ensures that external forces and/or vibrations experienced during use of the pipeline breakaway coupling 10 do not cause accidental disengagement of the connectors 28a,28b.

In this embodiment each valve cassette 20 is slidably received in its entirety within the hollow bore 18 of the respective valve housing member 12,14 and the interengagement of the mutually engageable connectors 28a,28b retains the valve cassette 20 between engagement surfaces 29a,29b provided within the respective valve housing member 12,14 and on the respective end cap 26.

It is envisaged that the pipeline breakaway coupling 10 may be used in a configuration in which either one or both of the valve cassettes 20 are omitted, if required.

Figure 11:
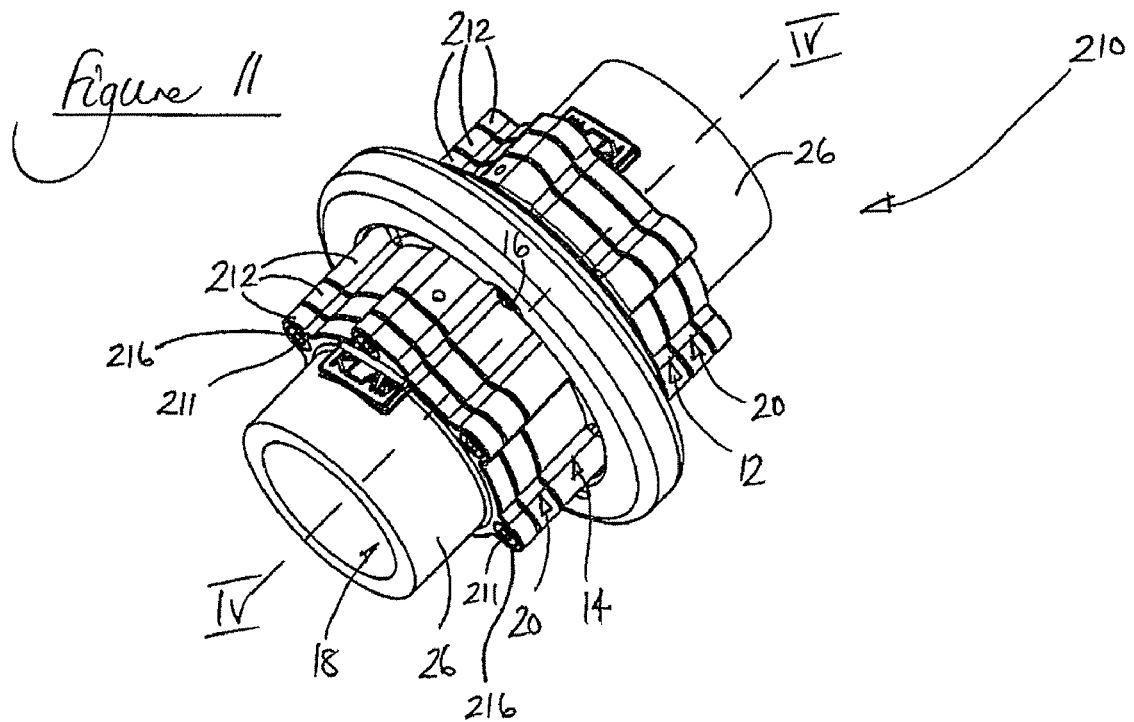
FIG. 11 shows a pipeline breakaway coupling according to a second embodiment of the invention.
Figure 12:
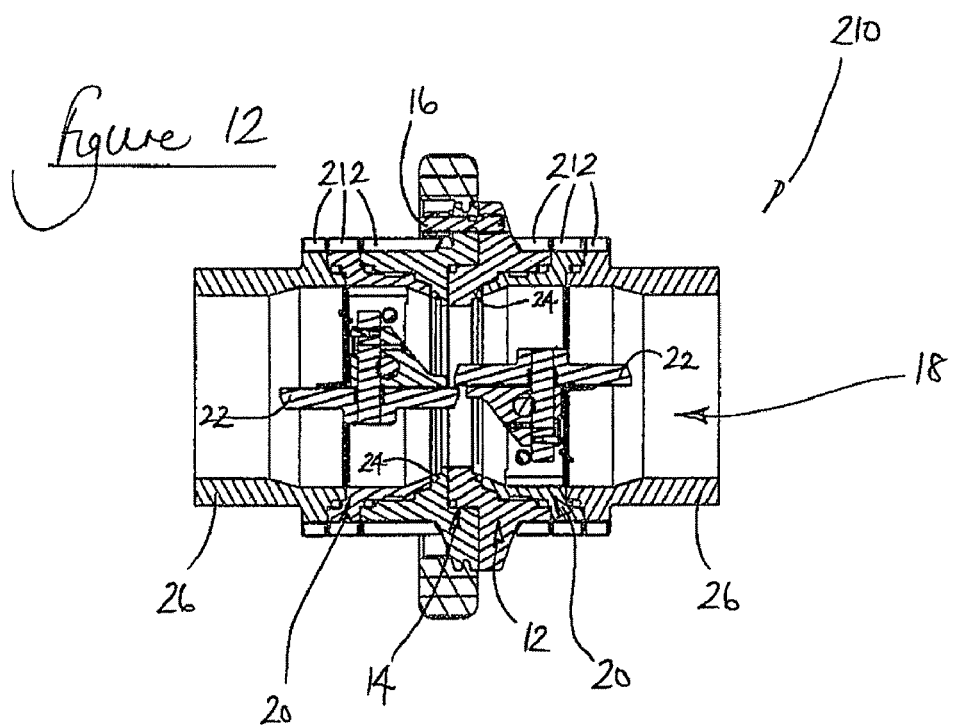
FIG. 12 shows a cross-sectional view of the pipeline breakaway coupling of FIG. 11 along the line IV-IV.

It is envisaged that other means for releasably connecting each valve housing member to a respective end cap may be employed in other embodiments of the invention and a second embodiment of a pipeline breakaway connector 210 is shown in FIGS. 11 and 12.

As in the first embodiment, the pipeline breakaway connector 210 includes first and second valve housing members 12,14 fixedly attached to each other by means of a plurality of breakaway coupling members 16.

The valve housing members 12,14 define a hollow bore 18 along which flowable material may flow, and the breakaway coupling members are breakable to permit separation of the valve housing members 12,14 when the pipeline breakaway coupling 210 is exposed to a tensile load exceeding a predetermined limit.

An end cap 26 is releasably connected to each of the valve housing members 12,14 to allow connection of the valve housing members 12,14 to inlet and outlet pipelines (not shown).

A valve cassette 20 is releasably retained between each valve housing member 12,14 and the respective end cap 26, each valve cassette 20 including a valve member 22 movable between a valve open position (FIG. 12) and a valve closed position. In its valve closed position, the valve member 22 sealingly engages a valve seat 24 formed in the respective valve housing member 12, 14 thereby closing the hollow bore of the respective valve housing member 12,14.

Each valve member 22 is biased to move to its closed position on separation of the valve housing members 12,14 to close the hollow bore of the respective valve housing member 12,14.

The valve housing members 12,14 are formed to define male and female members.

Figure 13:
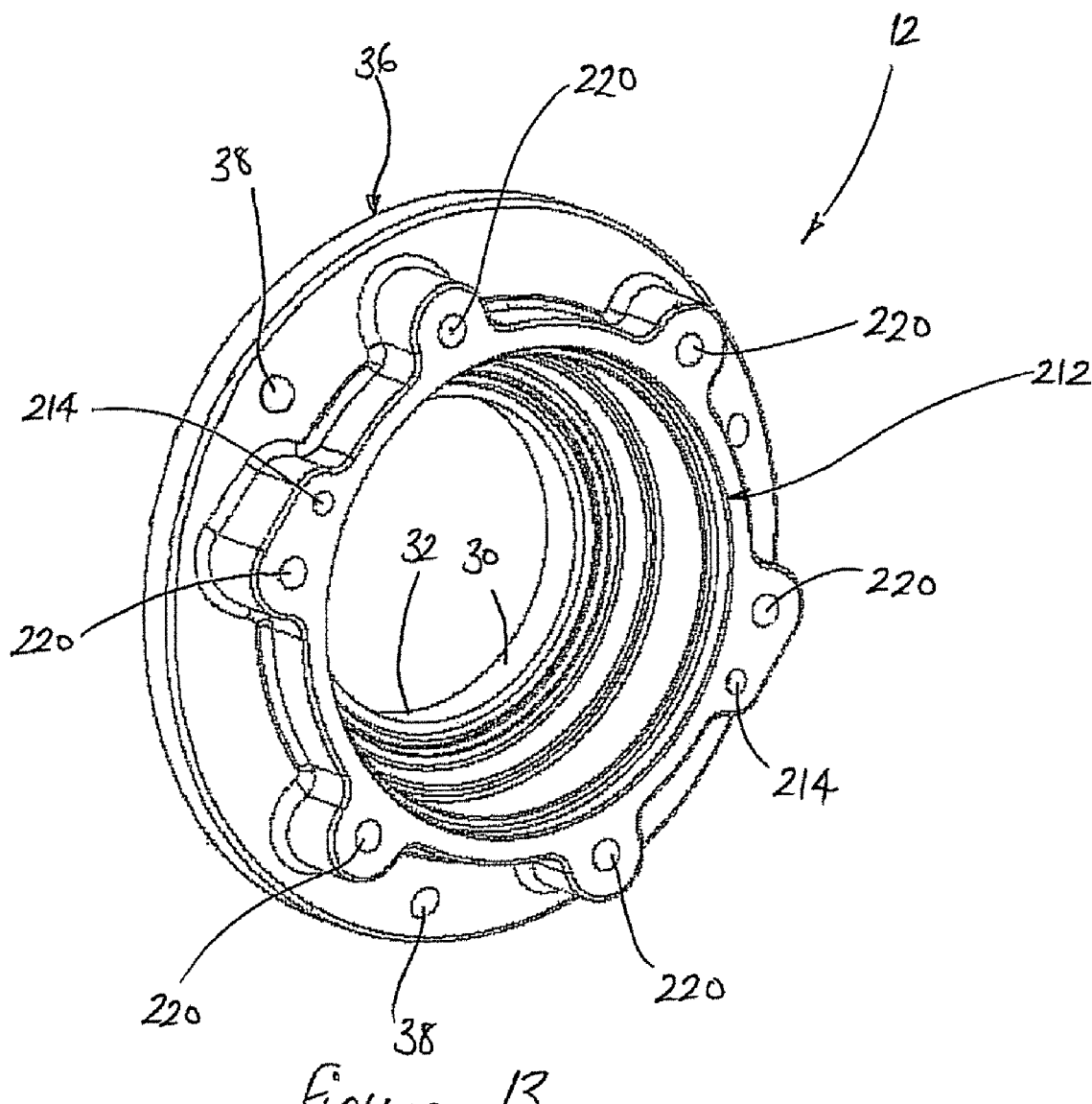
FIG. 13 shows a first valve housing member of the pipeline breakaway coupling of FIG. 11.

Referring to FIG. 13, the first valve housing member 12 is formed to define a male member including an annular engagement portion 30 protruding from an abutment end 32, which is intended to be brought into abutment with a corresponding abutment end of the second valve housing member 14.

The second valve housing member 14 includes a recessed opening in its abutment end shaped and sized to receive the annular engagement portion 30 of the first valve housing member 12 when the abutment ends 32 of the valve housing members 12,14 are brought into abutting engagement. The second valve housing member 14 is not shown in the figures but the recessed opening in the abutment end of the second valve housing member 14 is formed in the same manner as that shown in FIG. 5 in the first embodiment.

The abutment end 32 of each of the valve housing members 12,14 is formed to define a flange extending about its circumference, the flanges defining opposed contact surfaces 36 which on abutment of the valve housing members 12,14 are brought into abutting engagement. The breakaway coupling members extend through apertures 38 formed in the flanges to maintain the abutment surfaces 36 in abutting engagement and thereby fixedly attach the valve housing members 12,14 to each other.

As in the first embodiment, each of the breakaway coupling members preferably includes a stud 36 (FIG. 26) formed to include a weakened portion 38 that breaks on exposure to a tensile load exceeding the predetermined limit.

In other embodiments not shown in the figures, the abutment ends 32 of the valve housing members 12,14 may be formed such that the annular engagement portion 30 of the first valve housing member 12 and the recessed opening of the second valve housing member 14 are formed to define mutually engageable screw threads to fixedly attach the valve housing 12,14 members together. In such embodiments, the screw threads are breakable to permit separation of the valve housing members 12,14 when the breakaway coupling 10 is exposed to a tensile load exceeding the predetermined limit.

Each end cap 26 is releasably connected to the respective valve housing member 12,14 via the respective valve cassette 20.

This connection is achieved through the provision of connector rings 212 about the outer circumference of each valve housing member 12,14, the respective end cap 26 and the respective valve cassette 20, which are releasably connected to each other by means of removable coupling members.

The connector ring 212 of each valve housing member 12,14 preferably abuts the connector ring 212 of the respective valve cassette 20, which connector ring 212 in turn preferably abuts the connector ring 212 of the respective end cap 26.

In the embodiment shown in FIGS. 11 and 12, the removable coupling members include screws threadedly received within apertures formed in the connector rings 212.

Figure 14:
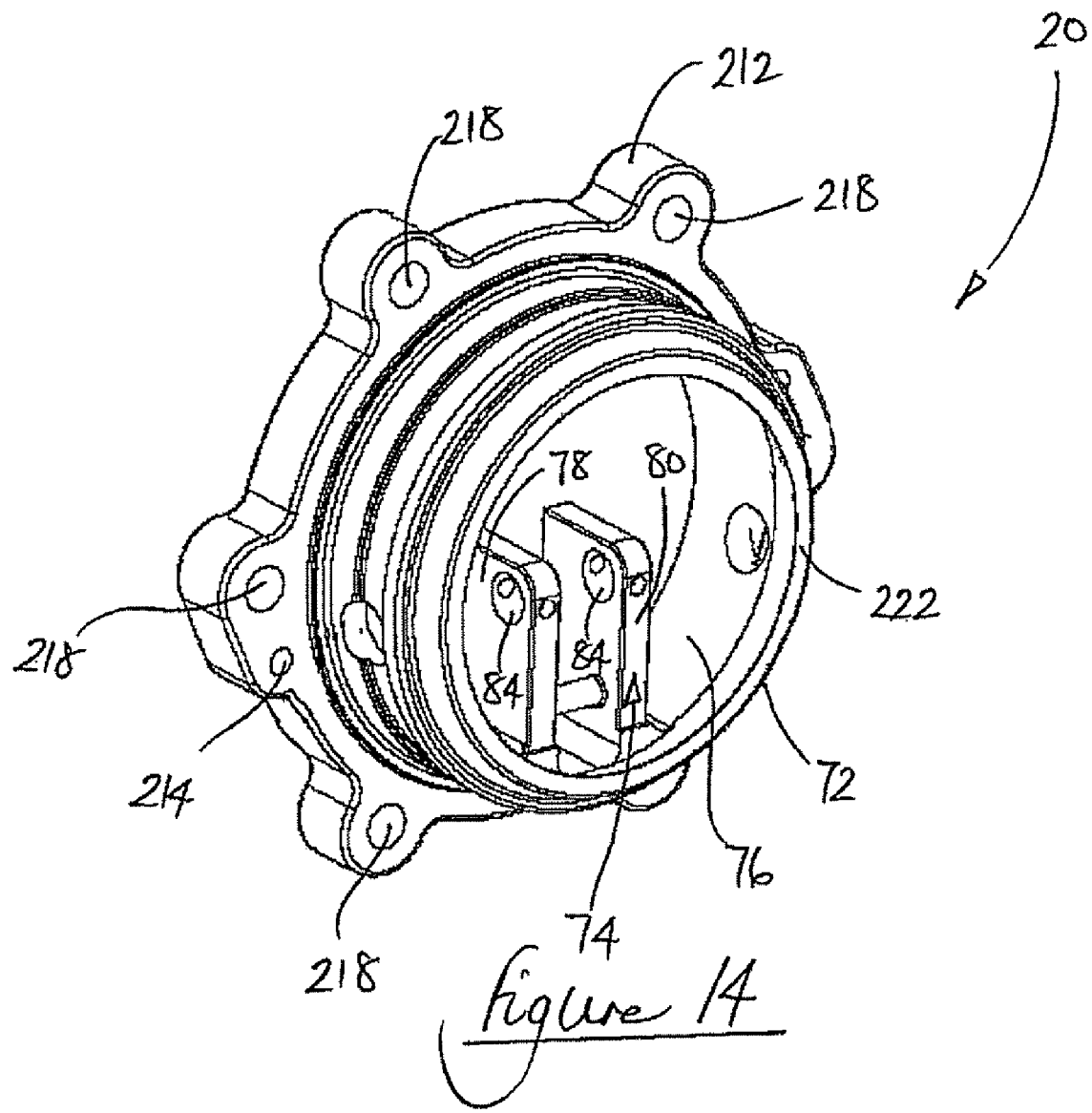
FIG. 14 shows a valve housing member of the pipeline breakaway coupling of FIG. 11.

In particular, each valve housing member 12,14 is connected to the respective valve cassette 20 by means of screws threadedly engaged in apertures 214 (FIGS. 13 and 14) provided in the connector rings 212 of each valve housing member 12,14 and the respective valve cassette 20. These apertures 214 are preferably arranged so that the valve cassette 20 can only be releasably connected to the respective valve housing member 12,14 in one particular orientation, thereby ensuring that the valve members 12 are oriented to ensure that they will close on separation of the valve housing members 12,14, as outlined below.

Figure 15:
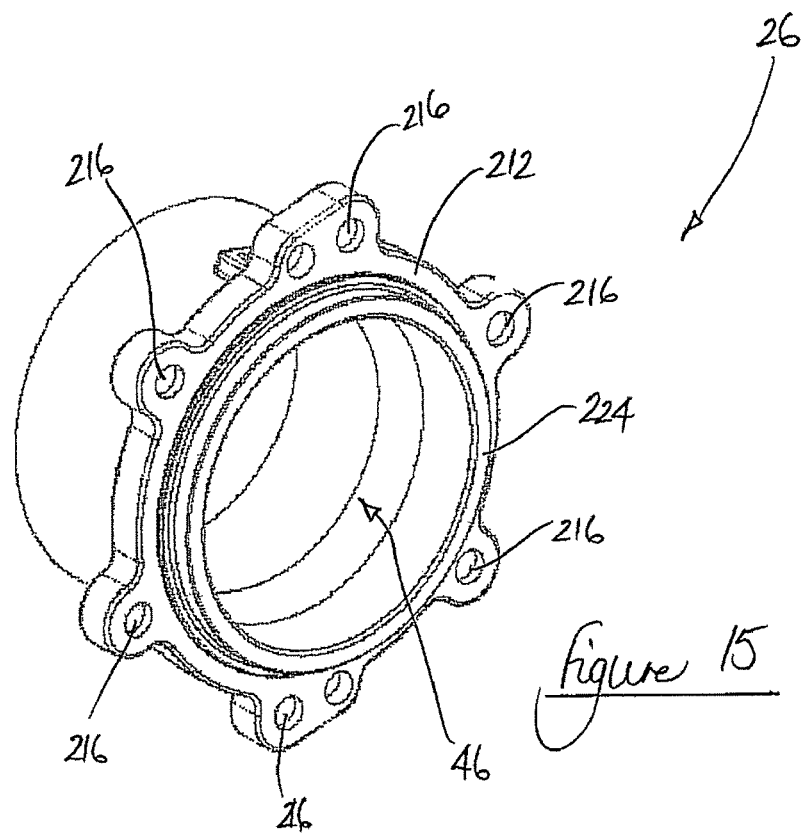
FIGS. 15 and 16 show opposite ends of an end cap of the pipeline breakaway coupling of FIG. 11.
Figure 16:
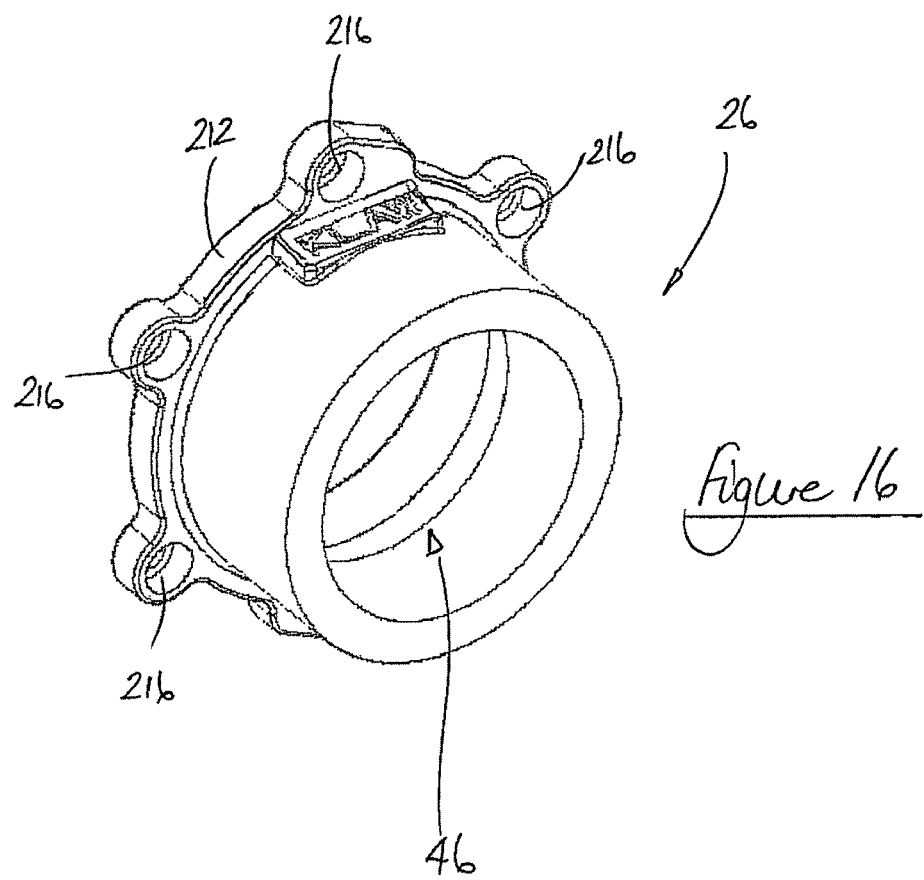

Each end cap 26 is then releasably connected to the respective valve housing member 12,14 by means of screws 211 (FIG. 11) threadedly engaged in apertures 216 (FIGS. 15 and 16) provided in the connector ring 212 of the end cap 26 which extend through non-threaded holes 218 (FIG. 14) provided in the respective valve cassette 20 and into threaded apertures 220 (FIG. 13) provided in the respective valve housing member 12,14. Each valve cassettes 20 is thereby releasably retained between a respective valve housing member 12,14 and a respective end cap 26.

The use of screws to connect the connector rings 212 of each valve housing member 12,14 with the respective valve cassette 20 and end cap 26 allows easy separation of the components to effect inspection, maintenance, repair and/or replacement of the individual components as required.

In the embodiment shown in FIGS. 11 and 12, each valve cassette 20 defines an abutment surface 222 (FIG. 14) that abuts the respective housing member 12,14 and each end cap 26 defines an abutment surface 224 (FIG. 15) that abuts the respective valve cassette 20.

These abutment surfaces 222,224 are formed in an identical manner to allow connection of each end cap 26 directly to the respective housing member 12,14 on removal of the respective valve cassette 20.

This arrangement allows the pipeline breakaway coupling 210 to be used in a configuration in which either one or both of the valve cassettes 20 are omitted since it permits each end cap 26 to be brought into sealing engagement with the respective valve housing member 12,14 in the absence of the respective valve cassette 20.

In the embodiment shown in FIGS. 11 and 12 each valve cassette 20 is slidably received at least in part within the hollow bore 18 of the respective valve housing member 12,14.

This ensures the valve member 22 of each valve cassette 20 is positioned within the hollow bore 18 of the respective housing member 12,14 and thereby reduces as much as possible the risk of any spillage on separation of the valve housing members 12,14.

Figure 17B:
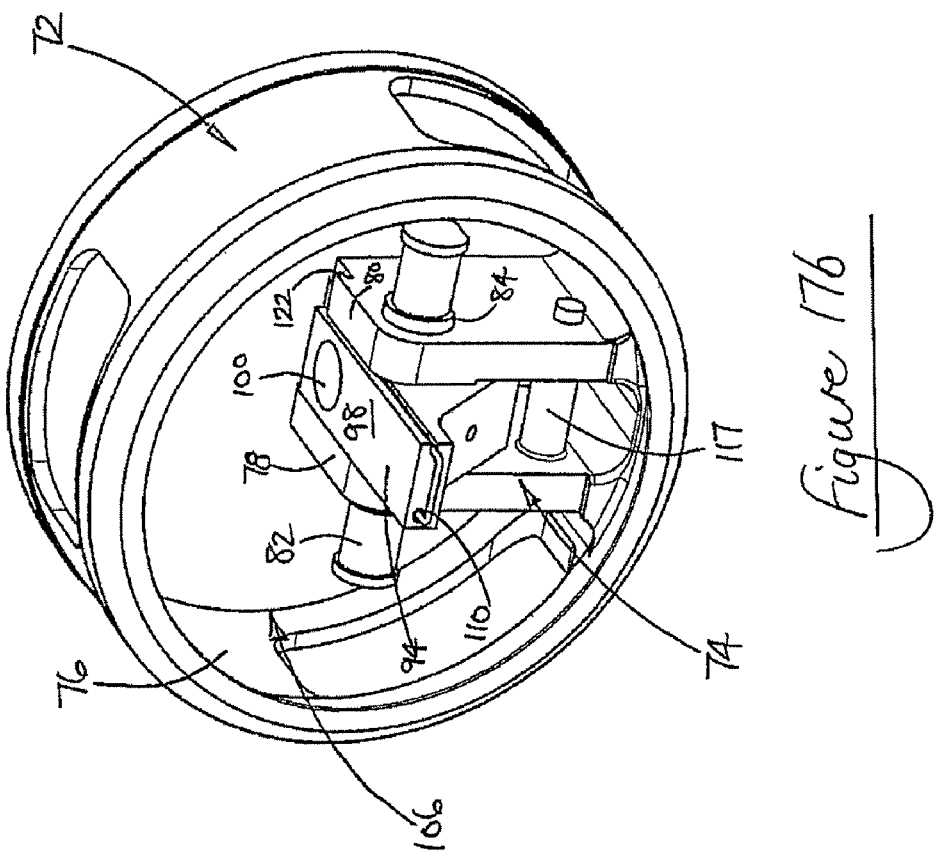
FIGS. 17a and 17b show opposite ends of an annular sub-housing of valve cassettes of the pipeline breakaway couplings of FIGS. 1 and 11 omitting its valve member.
Figure 17A:
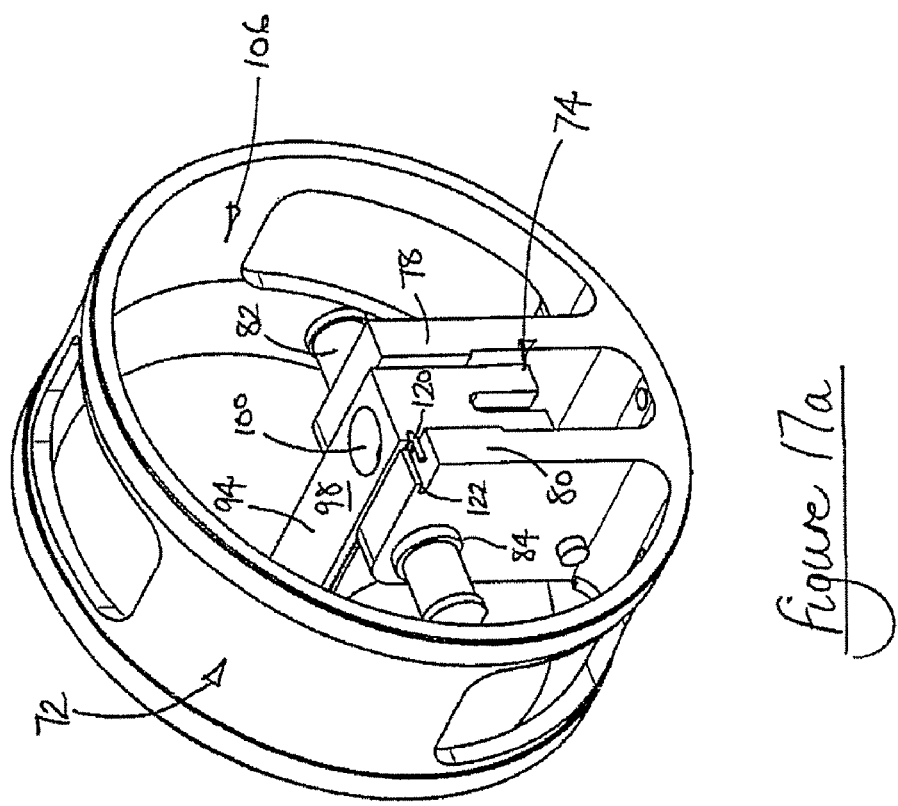

The valve cassette 20 of each of the first and second embodiments shown in FIGS. 1-16 includes an annular sub housing 72 and a valve mount 74 extending radially from an inner surface 76 of the sub housing 72, which is shown in more detail in FIGS. 17a and 17b.

Figure 20:
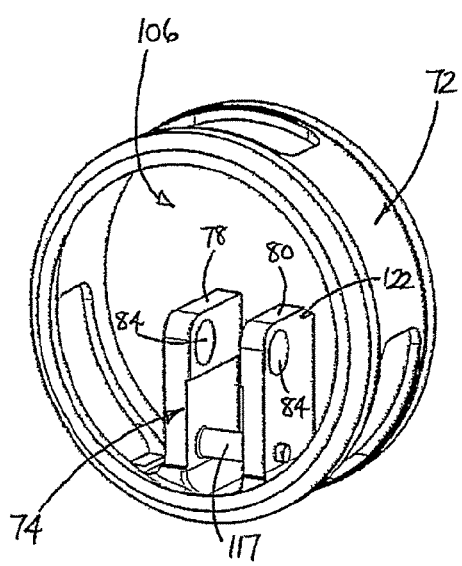
FIGS. 20 and 21 show opposite ends of a valve mount of the annular sub-housing of FIGS. 17a and 17b.
Figure 21:
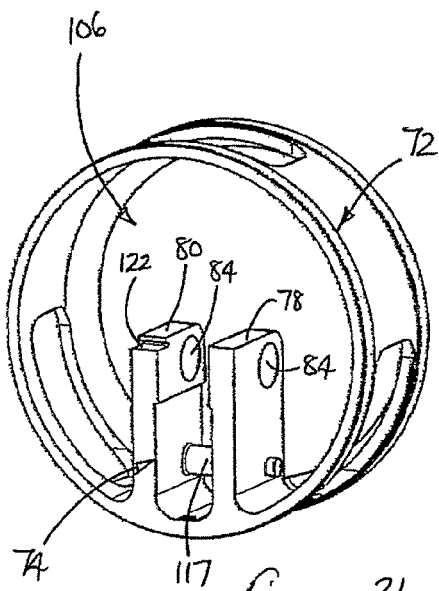
Figure 22:
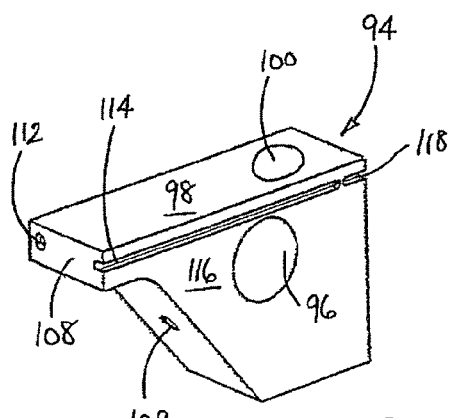
FIGS. 22 and 23 show opposite ends of a valve pivot member of the annular sub-housing of FIGS. 17a and 17b.
Figure 23:
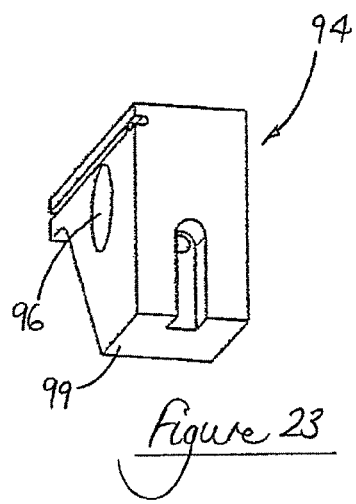

The valve mount 74 includes a pair of spaced limbs 78,80 protruding radially from the inner surface 76 of the sub housing 72, as shown in FIGS. 20 and 21. An aperture 84 is provided in each of the spaced limbs 78,80 and a valve pivot member 94 is pivotally mounted between the spaced limbs 78,80 on a pivot shaft 82 which extends through an aperture 96 in the valve pivot member 94 (FIGS. 22 and 23) and the apertures 84 provided in each of the spaced limbs 78,80.

Figure 24:
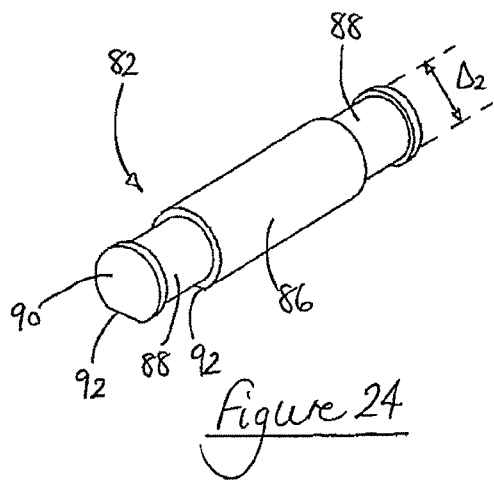
FIGS. 24 and 25 show opposite sides of a pivot pin of the annular sub-housing of FIGS. 17a and 17b.
Figure 25:
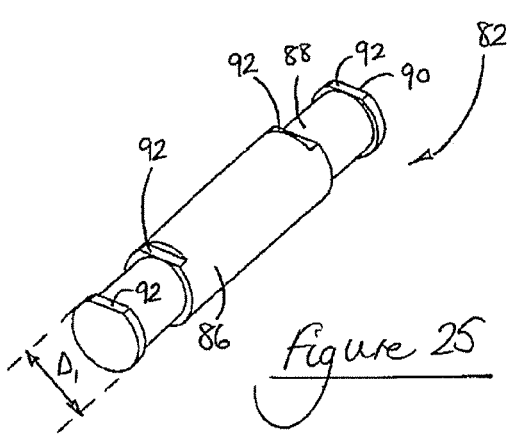

The pivot shaft 82 is shown in FIGS. 24 and 25 and includes a central section 86 of constant diameter $D_1$. Side sections 88 are provided on each side of the central section 86 of constant diameter $D_2$, which is less than $D_1$. A flange 90 is provided at each end of the pivot shaft 82, each flange 90 having the same diameter as the central section 86.

Figure 27:
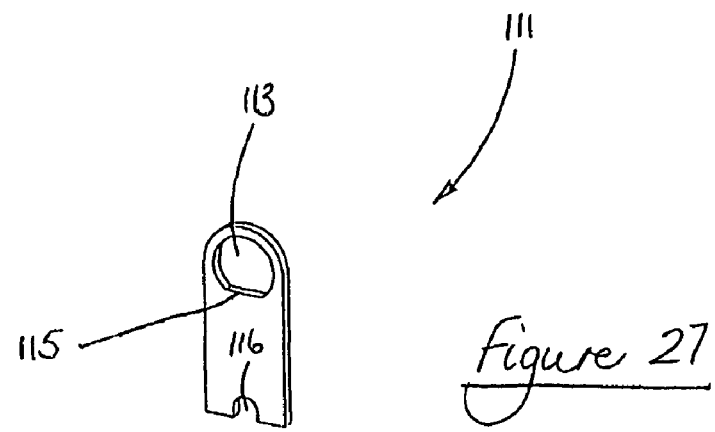
FIG. 27 shows a stop plate of the annular sub-housing of FIGS. 17a and 17b.

Flattened edges 92 are provided on each of the flanges 90 and at either end of the central section 86 immediately adjacent the side sections 88. The flattened edges at either end of the central section 86 provide surfaces for engagement with corresponding engagement surfaces formed in stop plates 111 (FIG. 27).

Each stop plate 111 is a planar member including an aperture 113 formed therethrough and including a flattened edge portion 115, which defines an engagement surface.

In use, the pivot shaft 82 is inserted through the apertures 84 provided in the spaced limbs 78,80 such that the flattened edges 92 at either end of the central section 86 protrude from outer surfaces of the spaced limbs 78,80. A stop plate 111 is then passed over the respective flange 90 at each end of the pivot shaft 82 by means of the aperture 113 formed in the stop plate 111, the flattened edge 92 formed on each flange 90 allowing the flange 90 to pass through the aperture 113. The stop plate 111 is then located in abutting engagement with the outer surface of the respective limb 78,80 such that the flattened edge portion 115 of the aperture 113 engages the respective flattened edge 92 at one end of the central section 86 of the pivot shaft 82. In this position, a recess 116 formed in the stop plate 111 engages a protruding end of a stop pin 117 fixedly arranged so as to extend through apertures formed in the opposite limbs 78,80 and protrude from the outer surfaces thereof. This engagement prevents movement of the stop plate 111 relative to the respective limb 78,80 and the engagement between the engagement surfaces of the pivot shaft 82 and the stop plate 111 in turn prevents rotation of the pivot shaft 82.

The stop plates 111 are held in position by contra wound portions of a spring element 119 mounted on each end of the pivot shaft 82 between the respective limb 78,80 and the respective flange 90, as will be described below.

Figure 28:
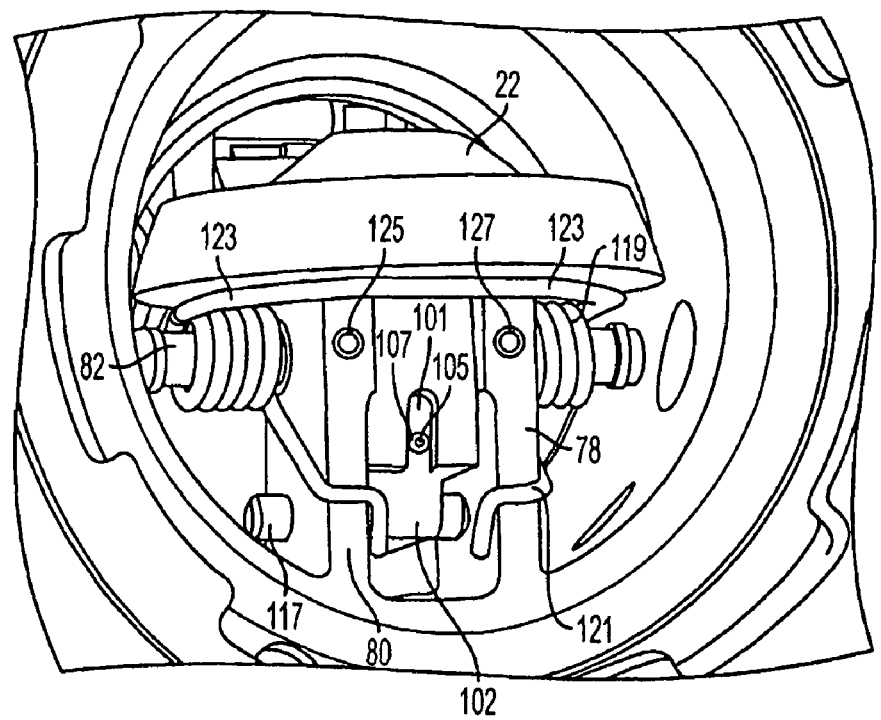
FIG. 28 shows a valve cassette located in a valve member of a pipeline breakaway coupling according to another embodiment of the invention.

In other embodiments, the flattened edges 92 on the pivot shaft 82 and the stop plates 111 may be omitted. In such embodiments, the pivot shaft 82 may be fixed so as to prevent rotation of the pivot shaft 82 and prevent its withdrawal from the apertures 84 in the limbs 78,80 by means of pins or rivets 125,127 extending through the respective limbs 78,80, as shown in FIG. 28.

Figure 19:
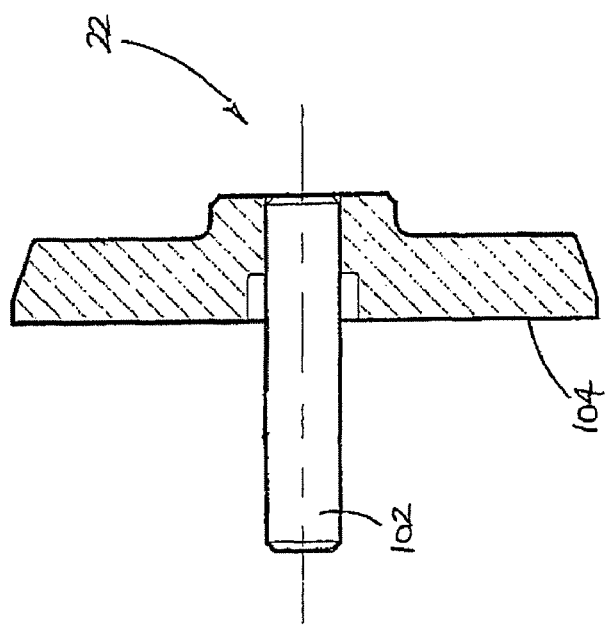
FIG. 19 shows a cross-sectional view of the valve member of FIG. 18 along the line III-III.
Figure 18:
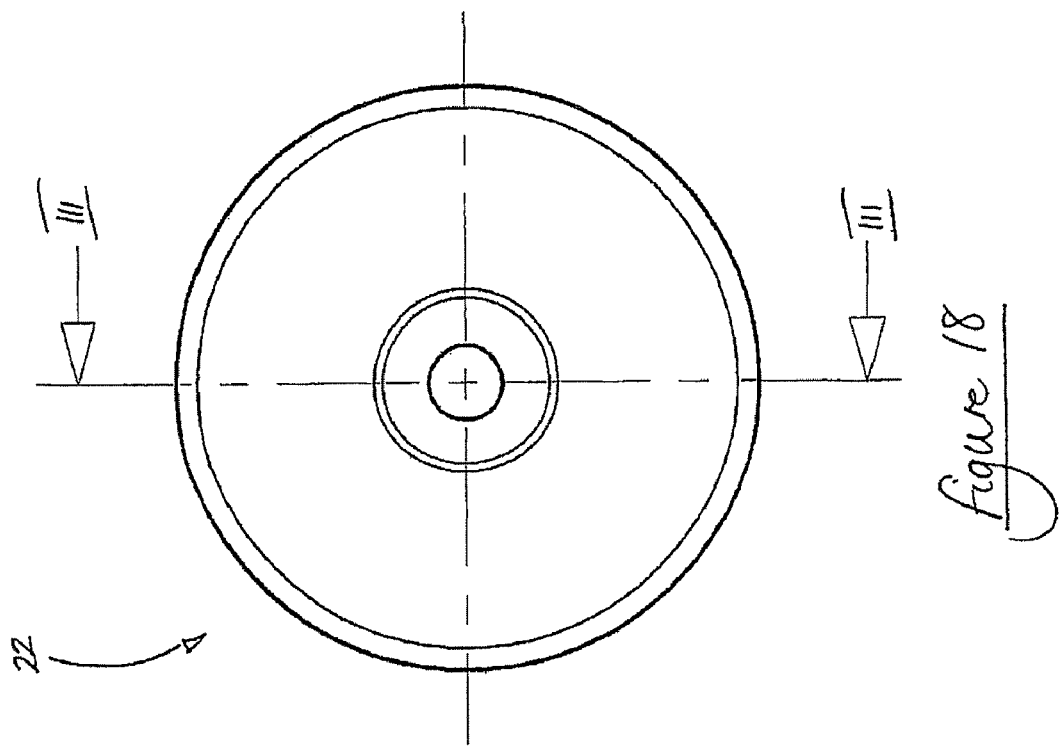
FIG. 18 shows a valve member of the valve cassette of FIGS. 17a and 17b.

The valve pivot member 94 includes a generally planar surface 98 in which an aperture 100 is provided to receive a shaft 102 extending from a rear face 104 of the valve member 22, which is a generally planar, circular disc member (FIGS. 18 and 19), such that rear face 104 of the valve member 22 rests on the generally planar surface 98 of the valve pivot member 94.

The shaft 102 may engage within the aperture 100 in order to retain the valve member 22 in position relative to the valve pivot member 94. In other embodiments, such as the embodiment shown in FIG. 28, the aperture 100 extends through the valve pivot member 94 and opens on an opposite surface 99. In this arrangement, a slot 101 formed in a side surface of the valve pivot member 94 allows access to the shaft 102, and thereby allows the insertion of a pin 105 through an aperture 107 formed through the shaft 102 and into an aperture 109 formed in the valve pivot member 94 on the opposite side of the shaft 102. This engagement retains the shaft 102 within the aperture 100 and thereby maintains the rear face 104 of the valve member 22 in abutting engagement with the planar surface 98 of the valve pivot member 94.

The valve pivot member 94 is biased to rotate so as to cause movement of the valve member 22 from its valve open position in which it bisects the hollow bore 106 of the sub-housing 72 to its valve closed position in which it sealingly engages against the valve seat 24 defined about the outer circumference of the sub-housing 72 by means of the spring element 119.

In other embodiments, valve seats 24 may be defined on inner surfaces of the valve housing members 12,14.

As outlined above, the spring element 119 includes contra wound portions mounted on opposite ends of the pivot shaft 82. Each contra wound portion of the spring element 119 includes, at an end abutting the respective limb 78,80, an extending portion 121 that engages and extends across the outer surface of the respective limb 78,80. The extending portion 121 is shaped to extend around the limb 78,80 and engage and inner surface thereof (FIG. 28).

Each contra wound portion of the spring element 119 includes an engagement portion 123 that is shaped to extend and engage beneath the rear face 104 of the valve member 22 where it is joined to the engagement portion 123 of the other contra wound portion.

As can be seen from FIGS. 2 and 12, the valve cassettes 20 in each of the first and second embodiments are received at least partially in the hollow bores 18 of the valve housing members 12,14 in an opposed configuration such that an edge portion of the valve member 22 of each valve cassette 20 abuts a nose portion 108 of the valve pivot member 94 of the other valve cassette 20. This interleaved arrangement of the opposed valve elements 22 results in the spring bias applied to each valve member 22 acting to oppose movement of the other valve member 22 to its closed position.

On separation of the valve housing members 12,14, and thereby disengagement of the valve members 22, the spring bias applied to each valve member 22 is free to cause movement of the valve member to its valve closed position.

To maintain the valve member 22 in its valve open position during construction of the breakaway coupling and on re-attachment of the valve housing members 12,14 following separation thereof, the valve cassette 20 includes a releasable latch member.

Referring to FIGS. 17a and 17b, the releasable latch member is provided in the form of a wire element 110 received at one end within an aperture 112 (FIG. 22) provided in the nose portion 108 of the valve pivot member 94. The wire element 110 extends across the nose portion 108 of the valve pivot member 94 in a spaced configuration relative to the nose portion 108 and around the valve pivot member 94 so as to lie within a groove 114 formed along a side wall 116 of the valve pivot member 94. The wire element 110 then passes through an aperture 118 towards the end of the side wall 116 remote from the nose portion 108. An engagement portion 120 of the wire element 110 protrudes from the aperture 118 and is selectively engageable within a C-shaped recess 122 formed in the limb 80 adjacent the side wall 116.

The relative positions of the wire element 110 and the recess 122 provided in the limb 80 adjacent the side wall 116 of the valve pivot member 94 means that the engagement portion 120 of the wire element 110 is only engageable within the recess 122 when the valve member 22 mounted on the valve pivot member 94 is in its valve open position.

Engagement of the engagement portion 120 of the wire element 110 in the recess 122 locks the valve pivot member 94 in position relative to the spaced limbs 78,80 and thereby retains the valve member 22 in its valve open position against the bias provided by the contra-would spring.

The opposed arrangement of the valve cassettes 20 slidably received in the valve housing members 12,14 means that on attachment of the valve housing members 12,14, abutment of each valve member 22 against the nose portion 108 of the other valve cassette 20 pushes the wire element 110 of the other valve cassette 20 towards the nose portion 108. This movement results in the engagement portion 120 of the wire member 110 being pushed out of the recess 122 such that the other valve member 22 is primed and free to move to its valve closed position on separation of the valve housing members 12,14.

The invention claimed is:

1. A pipeline breakaway coupling comprising:
a pair of valve housing members fixedly attached to each other by means of one or more breakaway coupling members, the valve housing members defining a hollow bore along which flowable material may flow and the breakaway coupling members permitting the valve housing members to separate from each other when exposed to a tensile load exceeding a predetermined limit;
an end cap releasably connected to each valve housing member to allow connection of the valve housing members to respective inlet and outlet pipelines via the end cap members; and
a valve cassette releasably retained between each valve housing member and the respective end cap, each valve cassette including a valve member movable between a valve open position and a valve closed position, the valve member when at its valve closed position being sealingly engaged with a valve seat formed as a single piece with the respective valve housing member to close the hollow bore through the respective valve housing member, and each valve member being biased to move to its valve closed position on separation of the valve housing members, wherein each valve cassette is slidably received at least in part within the hollow bore of the respective valve housing member and the valve cassettes are located in the valve housing members in an opposed configuration such that the valve members interengage and the bias applied to each valve member acts on the valve member to oppose movement of the other valve member to its valve closed position wherein each valve cassette includes an annular sub-housing and a valve mount extending radially from an inner surface of the sub-housing, the valve member being pivotally mounted on the valve mount, and the valve cassette further including a spring engaged between the valve member and the sub-housing to bias the valve member to the valve closed position in which it sealingly engages against said valve seat defined about an outer circumference of the sub-housing.

2. A pipeline breakaway coupling according to claim 1 wherein the valve housing members include flange portions defining opposed contact surfaces in abutting engagement, one or more breakable connector members extending through the flange portions to maintain abutment surfaces in abutting engagement and thereby fixedly attach the valve housing members to each other.

3. A pipeline breakaway coupling according to claim 1 wherein the one or more breakaway coupling members each includes a stud formed to include a weakened portion that breaks on exposure to the tensile load exceeding the predetermined limit.

4. A pipeline breakaway coupling according to claim 1 wherein the valve housing members are formed to define mutually engageable screw threads to fixedly attach the valve housing members together, the screw threads being breakable to permit separation of the valve housing members when exposed to the tensile load exceeding the predetermined limit.

5. A pipeline breakaway coupling according to claim 1 wherein each valve housing member is releasably connected to the respective end cap by means of mutually engageable connectors.

6. A pipeline breakaway coupling according to claim 5 wherein the mutually engageable connectors on each valve housing member and the respective end cap define a bayonet-type connector assembly permitting separation thereof on rotation of the valve housing member relative to the end cap.

7. A pipeline breakaway coupling according to claim 6 wherein each valve housing member and the respective end cap are formed to define a pair of opposed collars, one collar receivable within the other, the inner collar including a plurality of projections spaced about its outer circumference and the outer collar including a plurality of projections spaced about its inner circumference, the relative sizes of the projections on the opposed collars being chosen such that each projection on the inner collar passes between adjacent projections on the outer collar and, on rotation of the valve housing member relative to the end cap, the projections align to prevent withdrawal of the inner collar from the outer collar and thereby interconnect the valve housing member and the respective end cap until the valve housing member is rotated relative to the end cap to cause misalignment of the projections.

8. A pipeline breakaway coupling according to claim 6 wherein each valve housing member and/or the respective end cap includes a retention mechanism to prevent unintentional disengagement of the mutually engageable connectors of the valve housing member and the end cap.

9. A pipeline breakaway coupling according to claim 7 wherein each valve housing member or each end cap includes a retention mechanism in the form of a spring loaded plunger biased to extend between the projections provided on the respective end cap or valve housing member to which the valve housing member or end cap is connected and prevent rotation of each valve housing member relative to the respective end and thereby prevent unintentional disengagement of the connectors.

10. A pipeline breakaway coupling according to claim 9 wherein the or each spring loaded plunger is selectively retractable against the bias to permit selective rotation of each valve housing member relative to the respective end cap to allow intentional disengagement of the mutually engageable connectors.

11. A pipeline breakaway coupling according to claim 1 wherein each valve housing member is releasably connected to the respective end cap via the respective valve cassette.

12. A pipeline breakaway coupling according to claim 11 wherein each valve housing member and the respective end cap and valve cassette are formed to define connector rings about their outer circumferences, the connector rings being releasably connected to each other by means of one or more removable coupling members.

13. A pipeline breakaway coupling according to claim 12 wherein the connector ring of each valve housing member abuts the connector ring of the respective valve cassette which in turn abuts the connector ring of the respective end cap.

14. A pipeline breakaway coupling according to claim 12 wherein the connector rings are releasably connected to each other by screws threadedly received within apertures formed in the connector rings.

15. A pipeline breakaway coupling according to claim 12 wherein each valve cassette defines an abutment surface that abuts the respective valve housing member and each end cap defines an abutment surface that abuts the respective valve cassette, the abutment surfaces of the valve assemblies and the end caps being formed in an identical manner to allow connection of each end cap directly to the respective valve housing member on removal of the respective valve cassette.

16. A pipeline breakaway coupling according to claim 1 wherein each valve cassette is slidably received in its entirety within the hollow bore of the respective valve housing member.

17. A pipeline breakaway coupling according to claim 1 wherein each valve cassette includes a releasable latch member that acts to retain the respective valve member in the valve open position on movement of the valve member from the valve closed position to the valve open position prior to attachment of the valve housing members to each other or following separation thereof.

18. A pipeline breakaway coupling according to claim 17 wherein the releasable latch member of each valve cassette is released when the valve members are brought into abutting engagement on attachment of the valve housing members to each other.

19. The pipeline breakaway coupling according to claim 1, wherein each valve member, when in its valve closed position, is required to be sealingly engaged only with the valve seat formed as a single piece with the respective valve housing member in order to close the bore through the respective valve housing member.

* * * * *